Oct. 20, 1931.                H. W. MILLER                1,828,119
                              DIRECTION SIGNAL
                      Filed June 10, 1929        2 Sheets-Sheet 1
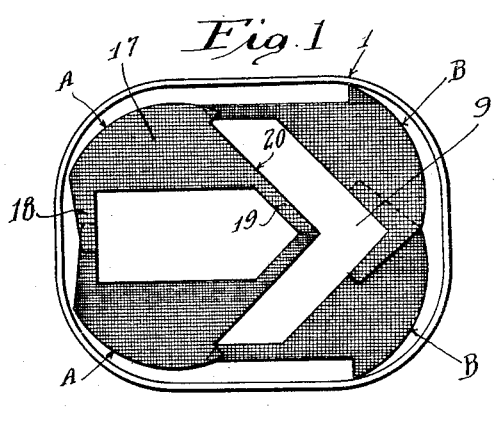
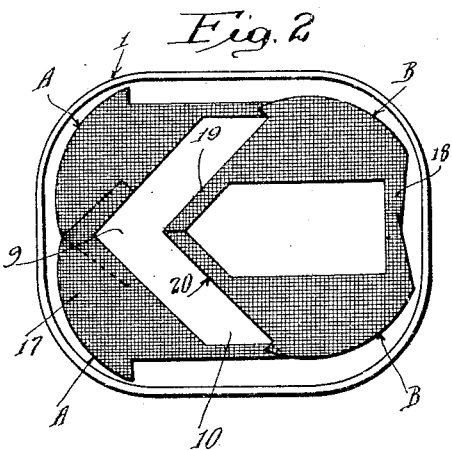
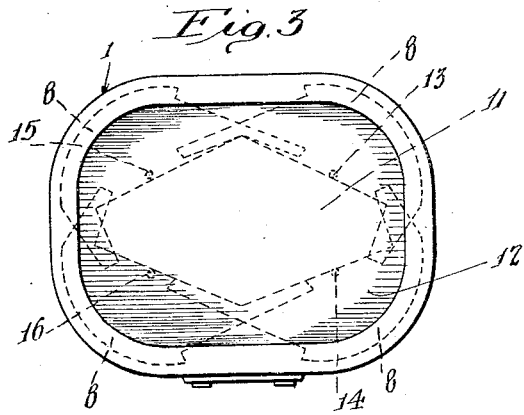
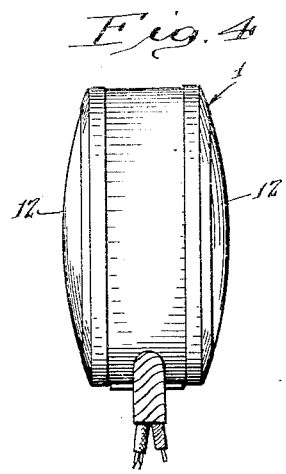
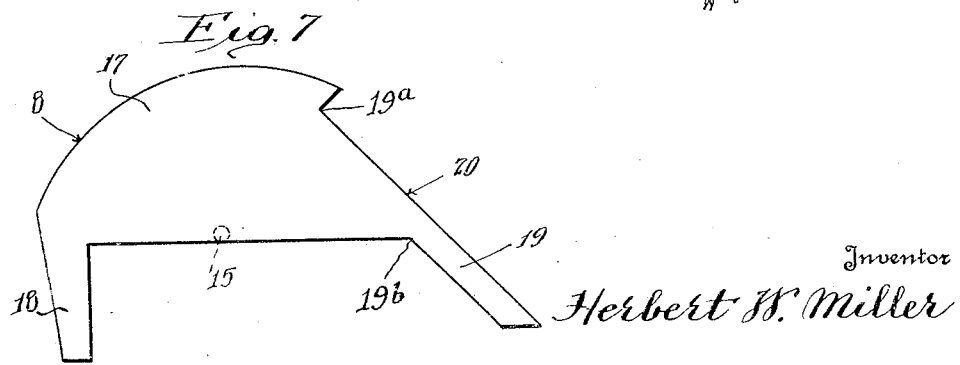
Inventor
Herbert W. Miller
By Lyon & Lyon
Attorneys Oct. 20, 1931.    H. W. MILLER    1,828,119
DIRECTION SIGNAL
Filed June 10, 1929    2 Sheets-Sheet 2

Inventor
Herbert W. Miller
By Lyon & Lyon
Attorneys

Patented Oct. 20, 1931

1,828,119

UNITED STATES PATENT OFFICE

HERBERT W. MILLER, OF BEVERLY HILLS, CALIFORNIA

DIRECTION SIGNAL

Application filed June 10, 1929. Serial No. 369,672.

This invention relates to direction signals and is more particularly related to a direction signal adapted to be mounted upon a motor vehicle in position to permit vision of the direction signal from either the front or the rear of the vehicle, preferably being mounted on the windshield or frame supporting the windshield of a motor vehicle on the left side to permit the vision of the signal device by the operator of the motor vehicle as well as from the front and rear of the motor vehicle.

In accordance with the established practice, the motor vehicle driver when desiring to turn either to the right or left gives a signal with his hand. This hand or arm signaling requires that the operator of the motor vehicle release with at least one hand the steering wheel and operate the vehicle when making a turn with a single hand. When driving closed motor vehicles it is not possible to make a signal with the hand or arm, and even though such signals may be required by the law, the signaling is many times avoided because of the inability of the operator to make the signal at the required moment, either because of the fact that the car is completely closed or the operator requires two hands to correctly operate the vehicle without endangering himself.

Signaling in the daytime by means of an arm or hand is satisfactory to a degree. The same signal given at night is not satisfactory to the same degree due to the fact that the operator's arm is not as visible at night and also because of glares of lights coming from the opposite direction, street lights and the light which practically make the operator's arm invisible to the operator of another motor vehicle proceeding either in the opposed direction or in the same direction.

Many states have enacted laws requiring the use of signals for indicating right and left turns to be installed upon closed cars. It is impossible to enforce these laws because there is at present no device which will satisfactorily meet the requirements of such laws and will properly indicate the signals to other approaching vehicles or pedestrians.

It is therefore an object of this invention to provide a signal device which is operative both during the day and night to produce a signal or signals which will indicate the direction of travel of the motor vehicle and which employs a plurality of black shutters operative to form arrow symbols against a white or similarly light-colored background.

Other objects and advantages of this invention it is believed will be apparent from the following detailed description of a preferred embodiment thereof as illustrated in the accompanying drawings.

In the drawings:

Figure 1 is a front elevation of a signal device embodying my invention illustrating the signal as actuated to indicate a right turn.

Figure 2 is a similar front elevation of a signal device illustrating the signal as actuated to indicate a left turn.

Figure 3 is a similar front elevation of the signal as actuated to a neutral position.

Figure 4 is an edge elevation thereof.

Figure 7 is a detached view of one of the vane members embodying my invention.

Figure 5:
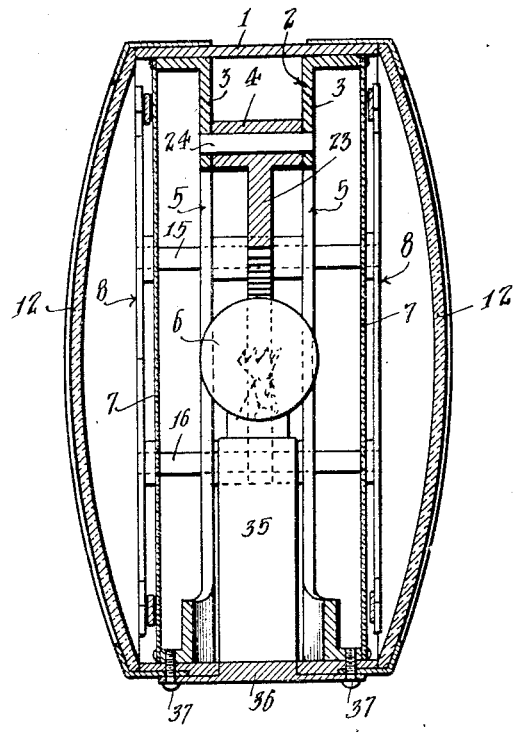
Figure 5 is a sectional edge elevation thereof.
Figure 6:
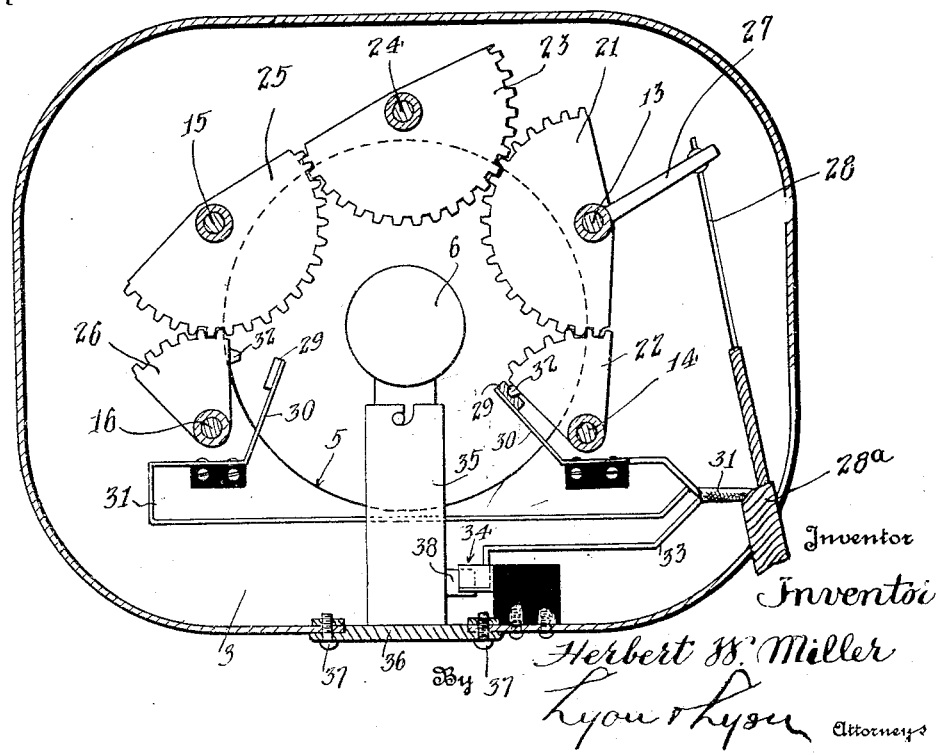
Figure 6 is an enlarged sectional front elevation of the signal device embodying my invention.

In the preferred embodiment of this invention illustrated in the accompanying drawings, 1 indicates a housing in which there is mounted a frame 2 consisting of spaced frame members 3 held in spaced relation by means of a spacer 4. The frame members 3 may be stamped out of sheet metal or the like and are provided with a central opening 5 in which a lamp 6 is mounted. Secured to the opposed faces of the frame members 3 are sheets of translucent material 7 which diffuse the light produced by the lamp 6. The sheets of material 7 are preferably white or of a light color to form a background against which the direction signals are formed by means of vanes 8.

The vanes 8, of which there are 4, are positioned within the housing 1 and formed with notches on their peripheries as indicated, and these vanes are operatively connected together in such a manner that on actuation the vanes may move into a position in which the notches cooperate to form an opening representing the arrow 9, as illustrated in Figure 1, indicating a right turn or an arrow 10, as illustrated in Figure 2, indicating a left turn. The vanes 8 may also be moved to a neutral position where they indicate that the vehicle may be either traveling straight ahead or may indicate that the vehicle is to stop. When used as a stop signal, the light 6 is illuminated with the signal displaying a plain figure as illustrated at 11 in Figure 3.

The vanes 8 are formed with black nap surfaces so that a black and white combination is formed between the vanes and the background 7 formed immediately to the rear of the vanes 8. The vanes 8 thus outline in black the figure of the arrows 9 and 10 or the neutral signal 11 of Figure 3.

Mounted on opposed faces of the housing 1 are convex glass plates 12 which are convex to prevent glare of sunlight or the like and permit vision of the signals formed by the vanes 8 at all times when the signal device is mounted upon a motor vehicle. The signal device thus formed is mounted upon a motor vehicle on the frame of the vehicle or upon the windshield mounted within the frame immediately adjacent the driver's seat of the motor vehicle so that the signal may be viewed from both front and rear of the motor vehicle and may also be viewed by the driver thereof.

In this signal a separate set of vanes 8 are used at the front and at the rear of the signal forming the direction arrows 9, 10 or the neutral signal 11 at both the front and the rear of the housing 1.

The means herein illustrated for forming direction arrows 9 and 10 and the neutral signal 11 with the vanes 8 are preferably of the following construction:

The vanes 8 are secured to shafts 13, 14, 15 and 16 within the housing 1 in advance of the translucent screens 7. Each vane 8 is of the same construction and includes a body 17, a tail-piece 18 and an inclined divider arm 19. The vanes 8 are for forming each arrow 9 or 10 or the neutral signal 11 mounted in pairs A and B. The use of the tail member 18 and the divider plates 19 enable the vane members 8 to form the entire signals, either the arrows 9 or 10, the neutral signal 11, entirely independently of the housing 1 forming a complete outline of black against the contrasting white or light-colored background formed by the screen 7. The pair of vanes A in one position as illustrated in Figure 1 form an opening giving the complete outline of the shank of the arrow 9 while the vanes B when in the position of Figure 1 when acting in conjunction with the divider members 19 of the vanes 8 of the pair A in conjunction with the inclined edge 20 of the vanes 8 form the arrow head. In this position the notches on each side of the tail members 19 of the vanes 8 of the pair B form an opening representing the point or apex of the arrow head.

In order to accomplish this each vane is provided with two notches 19a and 19b separated by the tail piece 19.

When the vanes 8 are actuated the vanes of the pairs A and B are reversed in position so that the vanes of each pair A and B perform the reverse function forming the arrow indicating the reverse direction of travel.

In order to actuate the vanes 8 to the positions to indicate the different signals, gear segments are employed including the gear segment 21 which is rigidly secured to the shaft 13 in position to mesh with gear segments 22 and 23 carried on the shaft 14 and upon the idler shaft 24. The idler gear segment 23 meshes with the idler gear segment 25 secured to the shaft 15, which in turn meshes with a gear segment 26 secured to the shaft 16. The vanes 8 mounted upon the outside faces of the screen 7 are secured to the shafts 13, 14, 15 and 16 in position so that when one of the shafts 13 is actuated the entire set of vanes will move to form the different signals. Secured to one of the vanes 21 or to the shaft 13, to which the vane 21 is secured, is an arm 27 which is connected at its outer end with a Bowden wire 28. The Bowden wire 28 extends through a flexible tube 28a to a point of access by the driver of the motor vehicle. Any suitable or desirable form of handle may be secured to the opposite end of the Bowden wire 28 and positioned within easy access of the driver of the motor vehicle.

In order to light the lamp 6 when the right and left direction arrows 9 and 10 are formed and only when the said signals are formed, I provide a contact switch consisting of contacts 29 which are secured to a contact arm 30 connected with a current supply conduit 31. The contacts 29 are positioned so that they operate as stops for the segments 22 and 26, and when the corresponding contacts 32 carried by the gear segments 22 and 26 are moved to the position occupied by these contacts when the gear segments have been moved to rotate the vanes 8 to position to form the arrows 9 and 10, a circuit will be completed through the conduit 31 and a ground formed by the ground connection between the casing 1 and the remainder of the ground circuit of the motor vehicle. The conduit 31 is connected with the electric cord 33 carrying two conductors that connect respectively to the terminals of a double knife switch 34 carried by the socket 35 within which the lamp 6 is mounted. The knife switch 34 is provided for the purpose of the easy removal and replacement of the lamp 6 within the housing 1 when desired. In order to permit this operation, the socket 35 is mounted upon a plate 36 secured to the housing 1 by means of a pair of screws 37. The socket and lamp may thus be removed from the housing 1 by removal of the screws 37 and the knife blade 38 will break its contact with the knife switch 34 and when inserted in position the knife blade 38 will complete the circuit to the lamp 6 by contacting the knife switch 34 when the circuit is completed through the switches formed by the contacts 29 and 32 carried by the vanes 22 and 26 respectively.

Any other suitable or desirable form of switch means may be provided for completing the electric circuit to the lamp 6 when the vanes 8 have been moved to the required positions to form the arrows 9 or 10.

If desired the lamp 6 may be connected also in a circuit with a switch formed by the brake pedal of the motor vehicle in a manner well understood in the art so that when the vanes 8 are moved to the neutral position, the lamp 6 will be illuminated by actuation of the brake pedal to form a stop signal.

Having fully described my invention, it is to be understood that I do not wish to be limited to the details herein set forth, but my invention is of the full scope of the appended claims.

I claim:

1. A segment including two pairs of pivotally mounted vanes, one pair of the vanes being formed with notches in their edges cooperating to form an opening representing the shank of an arrow in one position and the other pair of vanes having notches in their edges rendering them capable in a corresponding position to cooperate with the first pair of vanes to form an opening representing the head of an arrow, said vanes being formed so that when moved to an opposite position the notches in the edges of the first pair of vanes cooperate with the notches in the edges of the second pair of vanes to form an opening representing the head and shaft of an arrow facing in an opposite direction.

2. In a signal, the combination of four movable vane members, means for connecting the vane members together, and each vane member being formed of a body, a tail member and a divider plate and the vane members in combination outlining a direction arrow when actuated to one position and outlining a second arrow reverse in direction, in a second position, said divider plates in one of said positions defining the point of an arrow.

3. In a signal device, the combination of a housing, a plurality of vanes constantly in view mounted within the housing, means including a plurality of gear segments operatively connecting the said vanes so that they all move in unison, and means for actuating the gear segments to move the said vanes to opposed positions, said vanes having edges with a correlated form enabling the same to cooperate to form openings between the vanes representing opposed direction signals.

4. In a signal, the combination of a housing, spaced screens mounted within the housing, lighting means positioned between the screens, a set of pivoted vane members positioned within the housing outside of each of the screens and each set of vane members including four vanes, means connecting the vanes together to rotate in unison and the vanes being so formed that when moved to opposed position, they are all visible and outline an opening formed between the edges of all the vanes against the screens, arrows indicating opposed directions.

5. In a signal, the combination of four movable vane members, means for connecting the vane members together, each vane member being formed of a body, a tail member and a divider plate, and the vane members while all in view outlining a direction arrow when actuated to one position and outlining a second arrow reversed in direction in a second position, and stop means for holding the vane members in positions to outline the said arrows.

6. In a signal, the combination of a fixed casing, four vane members mounted therein, means for connecting the vane members together, each vane member being formed of a body, a tail member and a divided plate, lighting means positioned in the casing behind the said vane members, said vane members cooperating with each other to form an opening completely defined by the vane members, and the lighting means to outline a translucent direction arrow when actuated to one position and outlining a second translucent arrow when actuated to a second position.

7. In a signal device, the combination of a housing, a plurality of vanes mounted within the housing, a plurality of gear segments operatively connecting the said vanes, means for actuating the gear segments to move all the said vanes in unison into either of two opposite positions to outline right and left arrows in the form of an opening, and a screen contrasting in color with the said vanes, for daylight use positioned to the rear of said vanes and upon which the said direction signal is formed as outlined by said vanes.

8. A signal including two pairs of pivotally mounted vanes, one pair of the vanes being formed to outline the shank of an arrow in one position and the other pair of vanes having a corresponding position in which they cooperate with the first pair of vanes to form a transparency between the vanes outlining the head of an arrow, the vanes being formed so that when moved to the opposite position the first pair of vanes acts in conjunction with the second pair of vanes to form the head of the arrow and the second pair of vanes in the second position outlines the shank of the arrow, said vanes being capable of assuming a neutral position in which they form a figure of no significance.

9. In a signal, the combination of a plurality of vanes, all of said vanes having the same shape and size, means for actuating said vanes and for holding the same in three positions, including two different signaling positions and a neutral position, said vanes having a shape such that they are capable of forming an opening completely defined by the vanes in the shape of an arrow pointing in one direction in one of the signaling positions, and an arrow pointing in the other direction for the other signaling position, and a figure of no significance in said neutral position.

10. In a signal, the combination of a plurality of vanes, all of said vanes having the same shape and size, means for actuating said vanes and for holding the same in three positions, including two different signaling positions, and a neutral position, said vanes having a shape such that they are capable of defining the entire outline of an arrow pointing in one direction in one of the signaling positions, and an arrow pointing in the other direction for the other signaling position, and a figure of no significance in said neutral position, said vanes operating to form the entire outline of the edge of the signals in both signaling positions.

11. A signal constructed as described in claim 10 in which there are four vanes with means for connecting the same so that they all move in unison.

Signed at Los Angeles, Calif., this 29th day of May, 1929.

HERBERT W. MILLER.